United States Patent
Porte et al.

(10) Patent No.: US 11,655,045 B2
(45) Date of Patent: May 23, 2023

(54) ANTERIOR PART OF THE NACELLE OF AN AIRCRAFT PROPULSION ASSEMBLY WHOSE AIR INTAKE LIP IS LINKED TO THE OUTER PANEL BY NESTING

(71) Applicant: Airbus Operations SAS, Toulouse (FR)

(72) Inventors: Alain Porte, Toulouse (FR); Jacques Lalane, Toulouse (FR); Frédéric Vinches, Toulouse (FR); Franck Dobigeon, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 247 days.

(21) Appl. No.: 16/990,260

(22) Filed: Aug. 11, 2020

(65) Prior Publication Data

US 2021/0107666 A1    Apr. 15, 2021

(30) Foreign Application Priority Data

Aug. 13, 2019 (FR) ...................................... 1909179

(51) Int. Cl.
*B64D 29/06* (2006.01)

(52) U.S. Cl.
CPC .................... *B64D 29/06* (2013.01)

(58) Field of Classification Search
CPC .......... B64C 7/02; B64D 29/00; B64D 29/02; B64D 29/04; B64D 29/06; F02C 7/04;
(Continued)

(56) References Cited

U.S. PATENT DOCUMENTS 6,131,855 A    10/2000 Porte
6,179,249 B1 *   1/2001 Canadas ................ B64D 33/02
                                                                244/129.4
(Continued)

FOREIGN PATENT DOCUMENTS

DE          10218713 C1 * 10/2003 .............. E04F 15/02
EP          0921293 A1    6/1999
(Continued)

OTHER PUBLICATIONS

Richard L. Kreitinger and David B. Middleton, "Aircraft Surface Coatings for Drag Reduction/Erosion Protection," SAE International, 1981, SAE Transactions vol. 90, section 4, pp. 3477-3491. (Year: 1981).*

(Continued)

*Primary Examiner* — Joshua J Michener
*Assistant Examiner* — Ryan Andrew Yankey
(74) *Attorney, Agent, or Firm* — Greer, Burns & Crain, Ltd.

(57) ABSTRACT

An anterior part of an aircraft propulsion assembly nacelle, having an air intake lip disposed at a front end and an outer panel, of which an outer face extends an outer part of the air intake lip. A front edge of the outer panel and a rear edge of the air intake lip are shaped so as to overlap radially and to nest so as to ensure a continuous surface between the outer surface of the outer part of the air intake lip and the outer face of the outer panel. Moreover, the front edge of the outer panel is connected to the rear edge of the air intake lip with no added rigid element. This permits a rigid connection while avoiding creating local irregularities on the outer surface of the nacelle, which irregularities might disrupt the flow of air around the nacelle, giving rise to additional drag.

13 Claims, 6 Drawing Sheets

(58) Field of Classification Search
CPC ...... F02C 7/047; F16B 5/0012; F16B 5/0016; F16B 5/0056
See application file for complete search history.

(56) References Cited

U.S. PATENT DOCUMENTS

| | | | | |
|---|---|---|---|---|
| 8,434,724 | B2* | 5/2013 | Chelin | B64C 21/04 244/134 B |
| 8,985,514 | B2* | 3/2015 | Cardin | B64C 1/069 244/131 |
| 9,777,632 | B2* | 10/2017 | Prather | F02C 7/047 |
| 11,149,770 | B2* | 10/2021 | Ballocchi | B64F 5/10 |
| 2007/0006543 | A1* | 1/2007 | Engstrom | E04F 15/02038 52/582.1 |
| 2010/0084507 | A1* | 4/2010 | Vauchel | F02C 7/04 244/1 N |
| 2010/0124494 | A1* | 5/2010 | Howarth | B64D 33/02 415/213.1 |
| 2011/0011056 | A1* | 1/2011 | Le Docte | B64D 15/163 60/39.093 |
| 2011/0173914 | A1* | 7/2011 | Engstrom | E04F 15/02038 52/582.2 |
| 2012/0048389 | A1* | 3/2012 | Chelin | B64D 15/04 137/15.1 |
| 2012/0318924 | A1* | 12/2012 | Porte | B64D 33/02 244/134 D |
| 2014/0199176 | A1* | 7/2014 | Tomeo | B23P 15/04 29/889.3 |
| 2015/0314850 | A1* | 11/2015 | Lumbab | B64D 33/02 29/505 |
| 2016/0023771 | A1 | 1/2016 | Riquet et al. | |

FOREIGN PATENT DOCUMENTS

| | | | | |
|---|---|---|---|---|
| EP | 3434597 | A1 * | 1/2019 | ............ B64D 27/18 |
| EP | 3590846 | A1 * | 1/2020 | ............ B64D 29/00 |
| EP | 3741680 | A1 * | 11/2020 | ............ B64D 15/04 |
| FR | 2922522 | A1 | 4/2009 | |
| FR | 3004165 | A1 | 10/2014 | |

OTHER PUBLICATIONS

"New etching process helps rough metals to bond," Sep. 14, 2016, Materialstoday, URL: https://www.materialstoday.com/metals-alloys/news/new-etching-process-helps-rough-metals-to-bond/ (Year: 2016).*
French Search Report; priority document.

* cited by examiner

ANTERIOR PART OF THE NACELLE OF AN AIRCRAFT PROPULSION ASSEMBLY WHOSE AIR INTAKE LIP IS LINKED TO THE OUTER PANEL BY NESTING

CROSS-REFERENCES TO RELATED APPLICATIONS

This application claims the benefit of the French patent application No. 1909179 filed on Aug. 13, 2019, the entire disclosures of which are incorporated herein by way of reference.

FIELD OF THE INVENTION

The present invention relates to aircraft propulsion assemblies and more particularly the nacelles of aircraft propulsion assemblies.

BACKGROUND OF THE INVENTION

A propulsion assembly is a device for generating thrust, which constitutes the motive force of the aircraft equipped with the propulsion assembly. An aircraft propulsion assembly is shown by way of example in FIG. 1.

Figure 2:
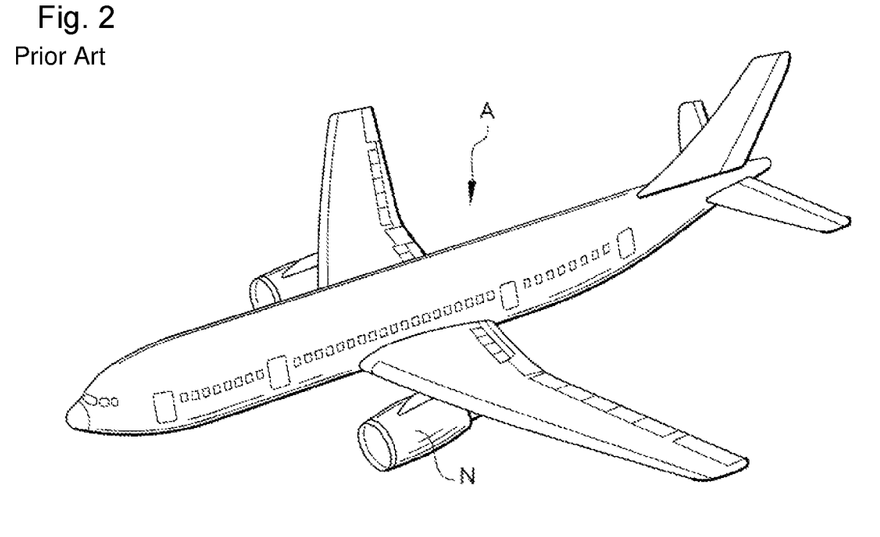
FIG. 2 shows an aircraft in a schematic three-dimensional view.

An example of a conventional installation of a nacelle N of a propulsion assembly on an aircraft A is shown in FIG. 2.

The nacelle conventionally has an anterior part P1 forming an air intake. The anterior part P1 has the role of collecting air so as to ensure even flow towards the fan. The nacelle also has a main part P2 constituting the rest of the nacelle.

The propulsion assembly generally extends about an axis referred to in the following as the longitudinal axis L. As a result of the generally substantially cylindrical shape of the nacelle about the longitudinal axis L, any straight line that intersects the axis L in a manner perpendicular thereto is referred to as radial.

A conventional structure of an anterior part P1 of a nacelle of an aircraft propulsion assembly, as is known from the prior art, is described with reference to FIG. 3.

The anterior part P1 of the nacelle comprises an air intake lip 1, which may be annular or substantially annular and is disposed at the front end thereof.

Throughout the present document, the concepts of "front" and "rear", of "anterior" and "posterior", and of "upstream" and "downstream" are to be understood with reference to the direction of the flow of air in the propulsion assembly. Thus, the air enters through the front of the propulsion assembly, that is to say through the anterior part P1 of the nacelle, and leaves (after some of the air has been used as oxidant) through the rear of the propulsion assembly, that is to say through the rear end of the main part P2.

Furthermore, throughout the present document, an "outer" element denotes an element that is radially remote from the longitudinal axis L, typically forming the boundary of the overall volume of the nacelle, while an "inner" element denotes an element that is close to the longitudinal axis L. For example, the primary and secondary flows of an aircraft propulsion assembly flow in the inner duct formed by the nacelle of the propulsion assembly.

The concept of internal (as opposed to the concept of external) to the nacelle denotes the region situated in the thickness of the aerodynamic profile forming the nacelle.

According to the conventional structure of an anterior part P1 of the propulsion assembly, a front frame 2 is disposed at the rear of the air intake lip 1. An inner structure 3 extends an inner part 10 of the air intake lip 1 towards the rear. In particular, the inner surface of the inner structure 3 extends the inner surface of the inner part 10 of the lip towards the rear and in a flush manner. The inner structure 3 may correspond to a soundproofing panel or any other form of wall defining a duct channeling the air in the direction of the motor situated in the main part.

An outer panel 4 extends an outer part 12 of the air intake lip 1 towards the rear. In particular, the outer surface of the outer panel 4 extends the outer surface of the outer part 12 of the air intake lip 1 towards the rear and in a flush manner.

A stiffening frame 5 also referred to as the rear frame defines the boundary between the anterior part P1 and the main part P2 of the nacelle.

The present invention relates in particular to the connection between the air intake lip and the outer panel 4. This connection is created on peripheral fastening lines, which can be termed "orbital seams", by riveting a rear edge of the air intake lip 1 to the outer panel 4.

Figure 3:
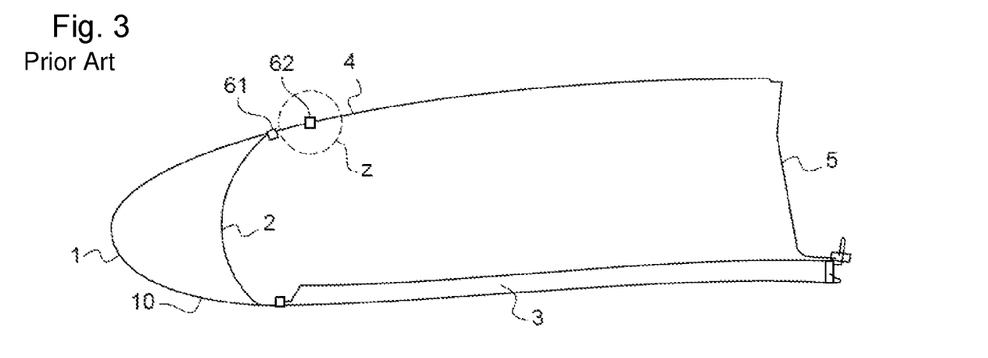
FIG. 3 shows, in a cross-sectional partial concept view, an anterior part of a nacelle of an aircraft propulsion assembly in accordance with the prior art.

FIG. 3 shows an example implementing two rows of rivets. Rivets 61 forming a first orbital seam are used for fastening the periphery of the front frame 2 on the air intake lip 1. Rivets 62 forming a second orbital seam are used for the connection between the air intake lip 1 and the outer panel 4.

In certain embodiments, it is nonetheless known to form a common connection (a single orbital seam) between the air intake lip 1, the front frame 2 and the outer panel 4.

The invention set out hereinbelow relates to the connection between the air intake lip 1 and the outer panel 4, but does not exclude the possibility of this connection also forming the connection between the air intake lip 1 and the front frame 2.

The rivets 62 which are used in the connection between the air intake lip 1 and the outer panel 4 form irregularities on the outer surface of the nacelle, which can disrupt the flow of air. In particular, the laminar nature of the flow on the outer surface of the nacelle can be locally disrupted by the rivets 62 which inevitably form slight dimples and/or bumps on the aerodynamic surface. More generally, any radial and/or axial discontinuity at the interface between two panels or assemblies (in this case between the air intake lip 1 and the outer panel 4) is likely to disrupt the smooth sliding of the layers of air over an aerodynamic surface.

Any disruption of the laminar nature of the flow of air can give rise to additional drag, which reduces the energy efficiency of the aircraft in question. In an anterior part of a nacelle of an aircraft propulsion unit, also referred to as the air intake, the connection between the air intake lip and the outer panel constitutes the first physical interruption of the aerodynamic lines of the nacelle, and the primary source of parasitic drag.

SUMMARY OF THE INVENTION

The invention aims to propose a configuration for the connection between the air intake lip and the outer panel of an aircraft propulsion unit nacelle that improves the laminar nature of the air flows at the surface of the nacelle, in particular at the surface of its anterior part.

Thus, the invention relates to an anterior part of a nacelle of an aircraft propulsion assembly, the anterior part having a front end that allows air to enter and a rear end that is intended to be connected to the rest of the nacelle. The anterior part comprises:

an air intake lip disposed at the front end, an outer panel, an outer face of which extends an outer part of the air intake lip, a front edge of the outer panel being connected to a rear edge of the air intake lip. The front edge of the outer panel and the rear edge of the air intake lip are shaped so as to overlap radially and to nest so as to ensure a continuous surface between the outer surface of the outer part of the air intake lip and the outer face of the outer panel. The front edge of the outer panel is connected to the rear edge of the air intake lip with no added rigid element fully penetrating the front edge of the outer panel and rear edge of the air intake lip.

The absence of a fully penetrating connection avoids the creation of bumps, dimples or any other geometric irregularity or discontinuity at the surface of the anterior part of the nacelle, at the connection, referred to as orbital, between the air intake lip and the outer panel.

Thus, the flow of air over the outer surface of the anterior part of the nacelle is not disrupted by local discontinuities or deformations, which allows a perfectly laminar flow of air.

The rear edge of the air intake lip may have a thinned section that reduces progressively to its end.

The front edge of the outer panel may be connected to the rear edge of the air intake lip using a glue.

The front edge of the outer panel may be connected to the rear edge of the air intake lip by welding or soldering.

The outer panel may be formed of a composite material and the front edge of the outer panel may be formed directly on the rear edge of the air intake lip, or the air intake lip may be formed of a composite material and the rear edge of the air intake lip may be formed directly on the front edge of the outer panel.

Either the rear edge of the air intake lip or the front edge of the outer panel may comprise radial openings that are filled with the other of the front edge of the outer panel and the rear edge of the air intake lip.

In this case, that one of the front edge of the outer panel and the rear edge of the air intake lip that fills the radial openings may be formed of a composite material, and comprise plies of composite material that fill the orifices and are distinct from the other plies constituting the outer panel or the air intake lip.

Either the rear edge of the air intake lip or the front edge of the outer panel may comprise radially projecting parts that are captively held in the other of the front edge of the outer panel and the rear edge of the air intake lip.

The front edge of the outer panel may radially tightly surround the rear edge of the air intake lip.

The rear edge of the air intake lip may radially tightly surround the front edge of the outer panel.

The nacelle anterior part may comprise a surface coating formed straddling the outer face of the outer panel and the outer part of the air intake lip.

The invention also relates to a nacelle of an aircraft propulsion unit, having an anterior part as described above.

BRIEF DESCRIPTION OF THE DRAWINGS

Further particular features and advantages of the invention will become more apparent from the following description.

In the appended drawings, which are given by way of non-limiting examples.

DETAILED DESCRIPTION OF THE PREFERRED EMBODIMENTS

Figure 1:
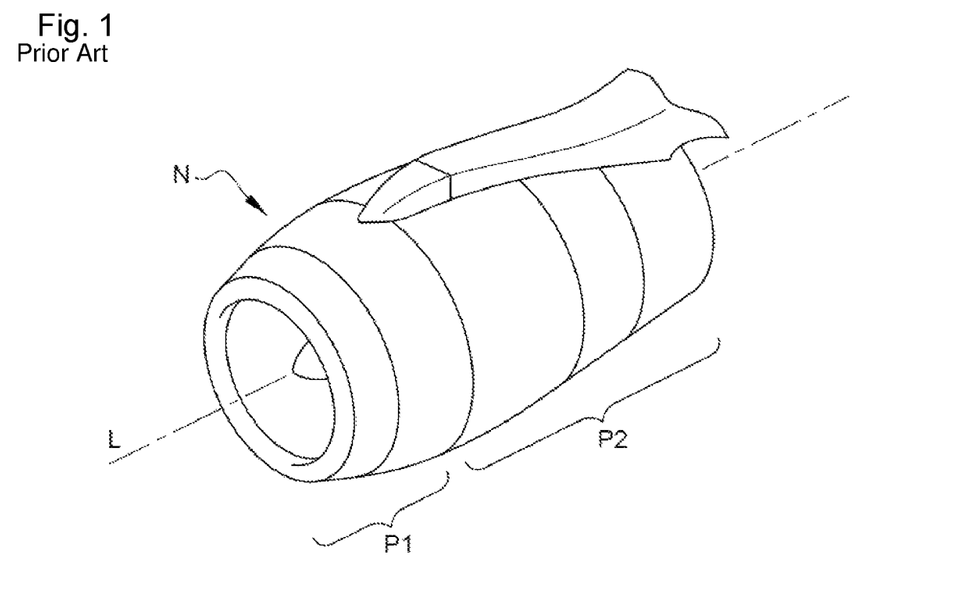
FIG. 1 shows an aircraft propulsion assembly in a schematic three-dimensional view.

FIGS. 1 to 3, which present general features of aircraft propulsion assemblies and a configuration of an anterior part of a nacelle in accordance with the prior art, were described above in the preamble of the present document. The same references as those used in the description of FIGS. 1 to 3 are used to denote the same elements in the remainder of the present description.

Figure 4:
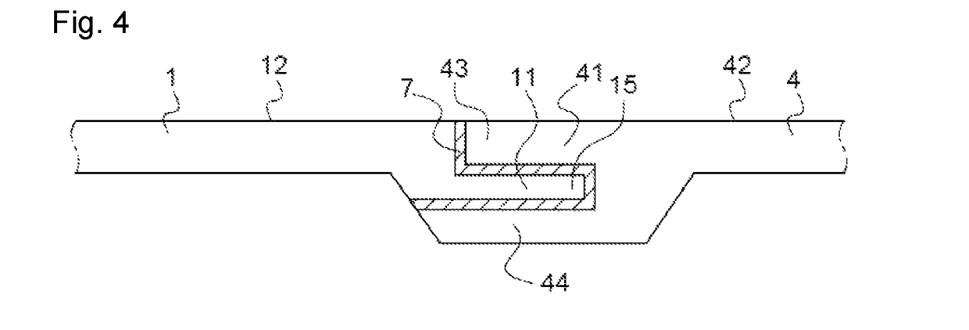
FIG. 4 shows, in a detail cross-sectional view, an example of a connection between an air intake lip and an outer panel of an aircraft propulsion unit nacelle front part according to one embodiment of the invention.

FIG. 4 shows a first example of a connection between the air intake lip 1 and the outer panel 4, which can be implemented in a nacelle anterior part according to the invention. Thus, FIG. 4 corresponds to a partial representation of a nacelle anterior part, specifically the zone Z indicated in FIG. 3 by a dashed line. Thus, FIG. 4 shows only those portions of the air intake lip 1 and of the outer panel 4 that are located on either side of their connection.

The front frame 2 is not shown in FIG. 4. It can be connected to the air intake lip 1, to the outer panel 4, or at the connection between the air intake lip 1 and the outer panel 4, preferably using connection means that do not fully penetrate the element to which it is connected. Connection means of this kind may, for example, be a glue, a solder or a partial-penetration weld.

The connection between the air intake lip 1 and the outer panel 4 comprises more particularly in connecting a rear edge 11 of the air intake lip to a front edge 41 of the outer panel 4. The objective is to ensure a perfectly continuous surface from an outer surface of the outer part 12 of the air intake lip 1 to an outer face 42 of the outer panel 4.

To that end, the rear edge 11 and the front edge 41 have matching shapes allowing one to nest in the other. In the example shown here, the front edge 41 of the outer panel 4 comprises a thickened part in which there is created a peripheral groove that receives all or part of the rear edge 11 of the air intake lip 1. Seen in section, as in FIG. 4, the front edge of the outer panel 4 therefore has a first branch 43 and a second branch 44 (located inside the aerodynamic profile of the nacelle). Thus, the rear edge 11 of the air intake lip 1 is tightly surrounded by the front edge 41 of the outer panel 4. In particular, the rear edge 11, and more particularly a radial setback 15 of the rear edge 11, is received between the first branch 43 and the second branch 44.

This configuration makes it possible to hold the air intake lip 1 in the correct position with respect to the outer panel 4, and, in particular, to perfectly match up the outer surface of the outer part 12 and the outer face 42 of the outer panel 4.

In order to create a rigid connection, the rear edge 11 of the air intake lip 1 is fastened to the front edge 41 of the outer panel 4 using a non-penetrating fastening means, that is to say one not having an added rigid element such as a rivet that fully penetrates the edge 41 and rear edge 11.

When the air intake lip 1 and the outer panel 4 are made of metal, the fastening means used can be a weld or a solder. In particular, soldering can be done between the front edge 41 of the outer panel 4 and the rear edge 11 of the air intake lip, which are nested one in the other.

A partial-penetration weld can be performed. For example, a partial-penetration weld proper can be performed, or a full-penetration weld between the second branch 44 and the rear edge 11 in its part that is tightly surrounded by the front edge of the outer panel 4, such that the weld is not visible on the outer face 42.

Alternatively or additionally, the fastening means used may comprise a glue or more generally an adhesive means.

A glue 7 or an adhesive may, in particular, be used when the outer panel 4 or the air intake lip 1 (or both) is made of a composite material or a hybrid metal/composite material. Of course, in all embodiments using an element made of a composite or hybrid material, the adhesion of this element on another element can be obtained without added glue, by polymerization of the composite or hybrid element on this other element. The envisaged composite materials include in particular composite materials having an organic matrix and reinforced with carbon and/or aramid fibers, or with another suitable fiber. The adhesive must advantageously withstand the high temperatures to which the components of the propulsion assembly are subjected. The adhesive can therefore be chosen from among polyepoxydes or epoxy able to withstand temperatures up to 150°, polyamide polymers able to withstand temperatures above 200°, BMI polymers whose application temperature is between those of epoxy resins and those of polyamides, phtalonitrile polymers which retain their mechanical properties at temperatures between −54° C. and 343° C., or cyanate ester resins having good compatibility with the other resins.

The conjunction of the nesting and the non-penetrating connecting means creates the connection between the air intake lip 1 and the outer panel 4 without deforming the outer face 42 of the outer panel 4 or the outer surface of the outer part 12 of the air intake lip 1. Moreover, the connection means (glue 7, solder, etc.) can be used to fill any residual gaps between the rear edge 11 of the air intake lip and the front edge 41 of the outer panel 4.

The continuity between the outer surface of the outer part 12 and the outer face 42 is therefore perfect, over the entire periphery of the anterior part of the nacelle, and no penetrating element locally deforms the outer aerodynamic surface of the nacelle front part.

Figure 5:
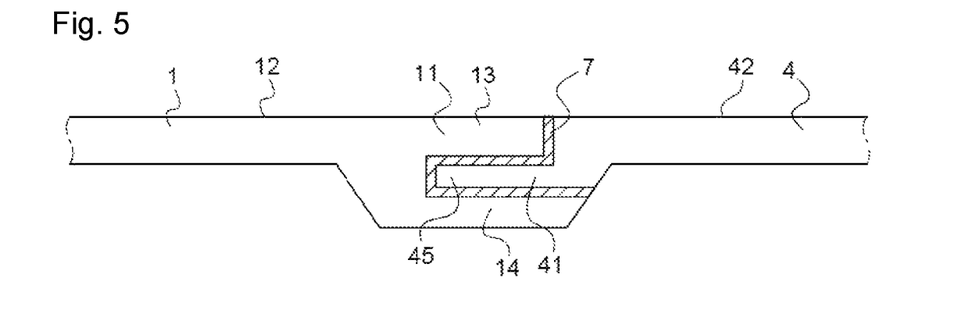
FIG. 5 shows, in a detail cross-sectional view, a variant of the connection between an air intake lip and an outer panel of the nacelle front part of FIG. 4.

FIG. 5 shows a variant of the connection shown in FIG. 4. According to this variant, it is the rear edge 11 of the air intake lip 1 which comprises a thickened portion in which there is created a peripheral groove that receives all or part of the front edge 41 of the outer panel 4, and which therefore has, when seen in section, a first branch 13 and a second branch 14 between which a radial setback 45 of the outer panel is received.

The description of FIG. 4 thus applies, with the necessary changes having been made or with consideration of the respective differences, to FIG. 5.

Figure 6:
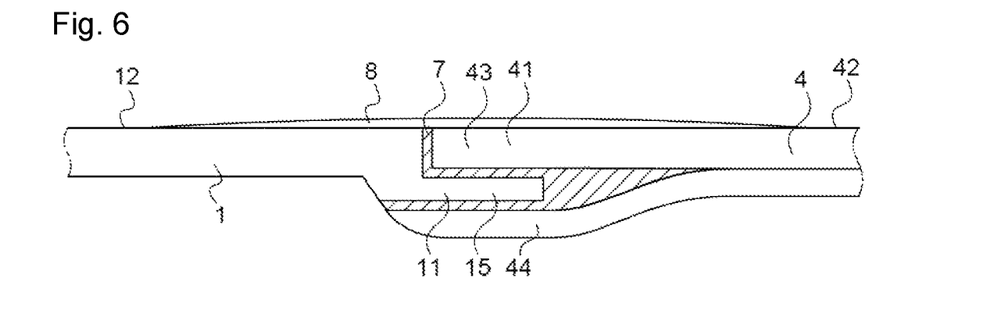
FIG. 6 shows, in a detail cross-sectional view, an example of a connection between an air intake lip and an outer panel of a front part of a nacelle for an aircraft propulsion unit, according to one embodiment of the invention, in which the outer panel is made of composite material.

FIG. 6 shows a connection between an air intake lip 1 and an outer panel 4, based on the same general principle as the connection shown in FIG. 4, in the particular case where the outer panel 4 is made of composite material. In particular, in the resulting connection, the front edge 41 of the outer panel is configured in such a way that it tightly surrounds the rear edge 11 (at a radial setback 15) of the air intake lip 1.

In the example shown here, a glue 7 is used to connect the outer panel 4 to the air intake lip 1. The connection may alternatively use an adhesive contained by pre-impregnation around the fibers of a composite material. In comparison with the embodiment of FIG. 4, the embodiment shown in FIG. 6 is noteworthy in that, the outer panel 4 being made of composite (or hybrid) material, the second branch 44 is formed in situ, when connecting the air intake lip 1, to the outer panel 4. Thus, the first branch 43 corresponds to the end of the outer panel 4, which is positioned on (that is to say, around, it being an essentially axisymmetric piece) the radial setback 15 of the rear edge 11 of the air intake lip. The second branch 44 is added and is connected to the rest of the outer panel 4 for example by a co-polymerization or co-curing process.

The second branch 44 is connected to the rear edge of the air intake lip by gluing, or by polymerization after prior treatment of the rear edge, if the latter is made of metal, or by co-polymerization if it is made of hybrid or composite material. A treatment of this kind can be applied in all embodiments of the invention in which adhesion between a metal piece and a piece made of composite material is desired.

FIG. 6 shows another aspect, specifically that a surface coating 8 can be formed straddling the outer face 42 of the outer panel 4 and the outer surface of the outer part 12 of the air intake lip 1. This coating, which is very thin, for example having an average thickness of the order of a few microns, makes it possible to obtain a perfectly continuous surface at the interface between the air intake lip and the outer panel 4. A coating of this kind can be used whatever the materials (metal or composite) respectively used for the air intake lip 1 and the outer panel 4. The composition of the coating and the way in which it is applied can easily be adapted to those materials. Thus, although it is illustrated only in FIG. 6, a coating of this kind can be used in any embodiment of the invention.

Any other nesting configuration, in the wide sense of the term, that is to say, having matching shapes that permit radial stacking between the rear edge 11 of the air intake lip 1 and the front edge of the outer panel 4, can be envisaged without departing from the scope of the invention. For example, instead of a radial setback, the rear edge 11 (or respectively the front edge 41) can have a thinned cross section that is essentially centered on the thickness of the air intake lip (or respectively of the outer panel) to be tightly surrounded by the front edge 41 (or respectively by the rear edge 11).

Moreover, as shown in FIGS. 7 to 14, certain embodiments of the invention implement a longitudinal nesting of the air intake lip 1 and of the outer panel 4.

Figure 7:
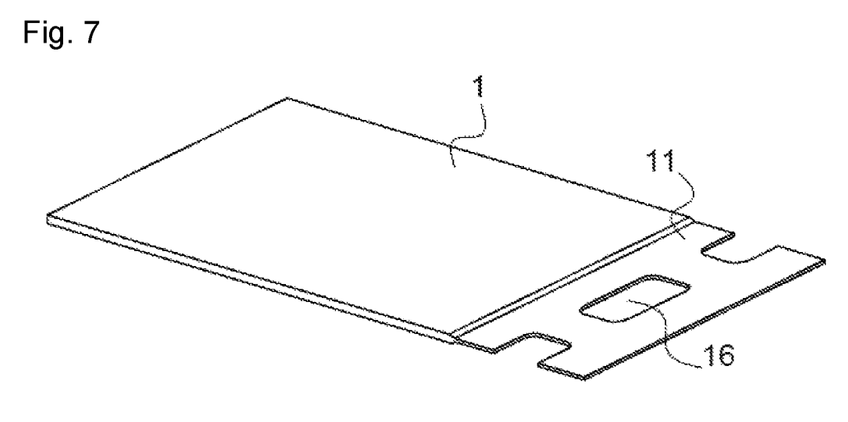
FIG. 7 shows, in a partial three-dimensional schematic view, an interface element that can be implemented for the connection between an air intake lip and an outer panel of an aircraft propulsion unit nacelle front part according to one embodiment of the invention.

Thus, FIG. 7 shows the rear edge 11 of a portion, that is to say, of an arc, of the air intake lip 1. By simplification, the part shown appears flat but generally has, in practice, a curvature in order to form a piece that is closed on itself, for example essentially annular. The rear edge 11 has a thinned section in which radial openings 16 are created.

Figure 8:
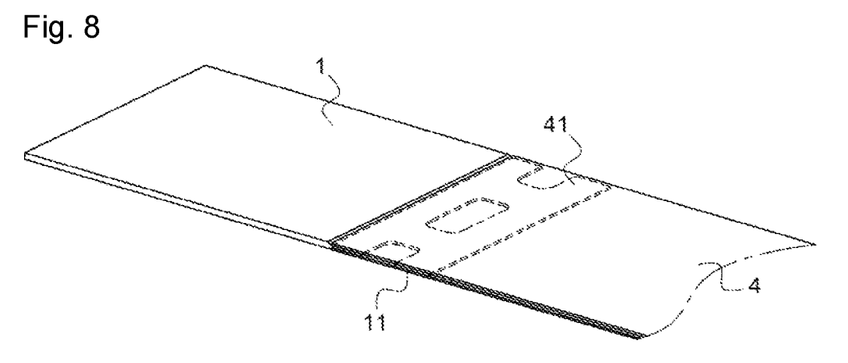
FIG. 8 shows, in a view similar to that of FIG. 7, a connection between an air intake lip and an outer panel of an aircraft propulsion unit nacelle front part, created with the element shown in FIG. 7.

When the outer panel 4 and the air intake lip 1 are connected, resulting in forming the element shown in FIG. 8, the radial openings are filled such that the front edge 41 is longitudinally nested with the rear edge 11. This configuration is particularly suitable when the outer panel 4 is formed of composite (or hybrid) materials, in that it can be poured directly onto the rear edge of the air intake lip 1, as a result of which the rear edge 11 is completely trapped in the front edge 41 owing to the radial openings 16. If a rigid outer panel 4 is joined to the air intake lip, whether the outer panel is made of metal, an already-cured composite or a hybrid material, the radial openings 16 can be entirely or partially filled with elements of the outer panel 4 that snap into these.

Figure 9:
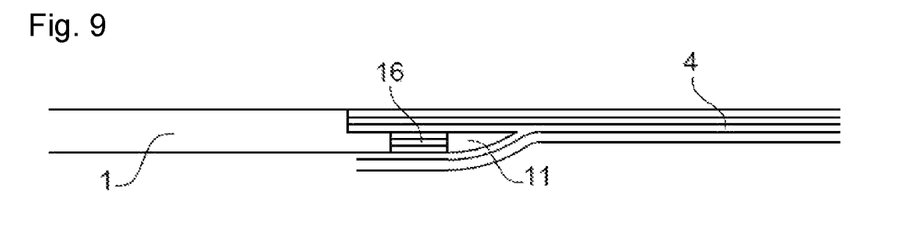
FIG. 9 shows, in a detail cross-sectional view, another example of a connection between an air intake lip and an outer panel of a front part of a nacelle for an aircraft propulsion unit, according to one embodiment of the invention, in which the outer panel is made of composite material.

FIG. 9 shows a variant of the embodiment of FIG. 8. Compared to the embodiment of FIG. 8, the embodiment of FIG. 9 comprises two features that can be applied independently of one another or in combination. According to this embodiment, the rear edge 11 of the air intake lip 1 is thinned. The thinning of the rear edge cross section permits a more rigid connection with an outer panel 4 made of composite material, which is formed, for example poured, directly onto the rear edge 11 of the air intake lip so as to tightly surround it. According to another feature of the embodiment of FIG. 9, plies of composite material are installed in the radial openings 16, before these are covered, both on the outer face of the rear edge 11 and on its inner face, with plies of composite material constituting the outer panel 4.

Between installing plies of composite material in the radial openings 16 and forming the outer panel, the rear edge 11 may optionally have spread on it, on its inner face and/or its outer face, a glue or an adhesive.

It is noteworthy that, in this embodiment, the rear edge 11 comprises a radial setback which permits, once the outer panel 4 has been formed, perfect surface continuity between the outer surface of the air intake lip 1 and the outer surface of the outer panel 4.

According to one embodiment of the invention, what is executed is therefore a method for forming an anterior part of a nacelle for an aircraft propulsion assembly, comprising:
providing an air intake lip comprising a thinned rear edge 11 comprising radial openings 16,
filling the radial openings with plies of a composite material,
covering at least one face of the thinned edge with plies of the composite material constituting an outer panel 4.

Optionally, the face of the thinned edge covered by the plies of the composite material constituting the outer panel 4 may have an adhesive spread on it prior to the covering.

In certain embodiments, the covering can be performed on both faces of the thinned edge 11 such that the thinned edge is tightly surrounded by the plies of the composite material constituting the outer panel 4.

Figure 10:
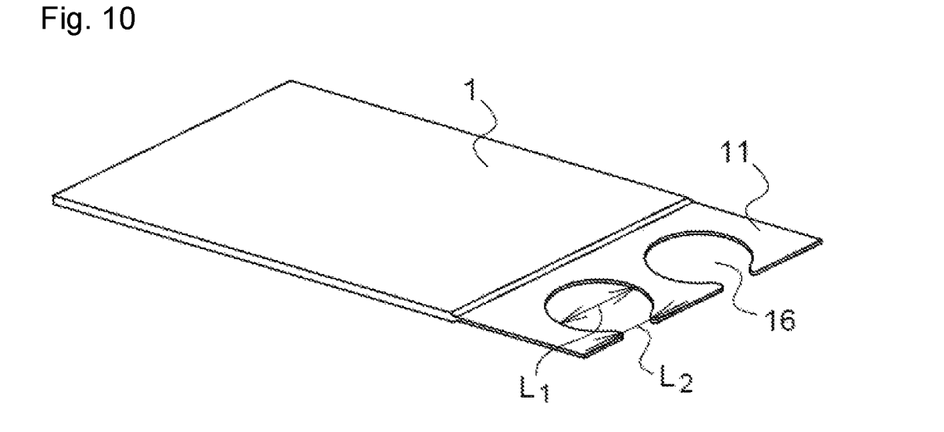
FIG. 10 shows, in a partial three-dimensional schematic view, another interface element that can be implemented at the connection between an air intake lip and an outer panel of an aircraft propulsion unit nacelle front part according to one embodiment of the invention.

The radial openings 16 may take the form of windows, as in the example shown in FIG. 7, or alternatively notches or "constrictions" as shown in FIG. 10. A constriction corresponds to an orifice that is open at the end of the rear edge 11, and having a median opening width L1 that is greater than its width L2 at the end of the rear edge 11.

The radial openings 16, whatever the shape thereof, can be machined in the piece or be formed directly therein, in particular if they are made of composite material.

Figure 11:
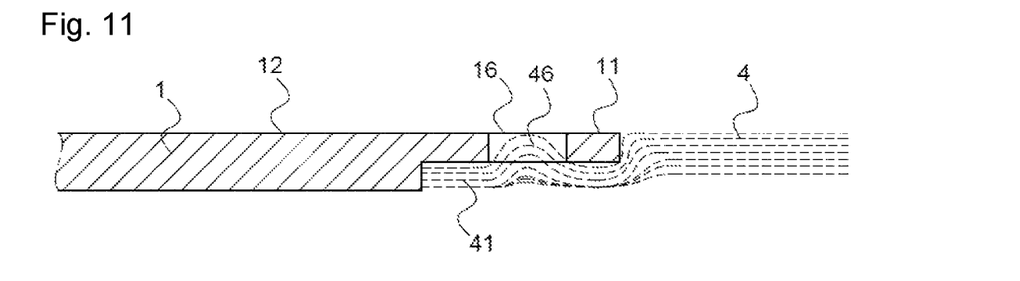
FIG. 11 shows, in a detail cross-sectional view, another example of a connection between an air intake lip and an outer panel of a front part of a nacelle for an aircraft propulsion unit, according to one embodiment of the invention, in which the outer panel is made of composite material.

FIG. 11 shows an exemplary embodiment in which the rear edge 11 of the air intake lip 1 has a thinned region, the thickness of which is comparatively smaller than the rest of the air intake lip. In the example shown, this thinned region extends, with no setback, the outer surface of the outer part 12 of the air intake lip. The outer panel 4 is made of composite material, and its front edge is formed, for example poured, directly on the rear edge 11 of the air intake lip. Thus, the front edge of the outer panel 4 makes up the rest of the thickness of the thinned region by overlapping the latter, which forms on the periphery of the nacelle a nesting arrangement between the rear edge and front edge once the outer panel 4 has cured. In order to ensure that the pieces are correctly longitudinally held with respect to one another, the rear edge 11 of the air intake lip comprises radial openings 16 that are filled by the front edge 41 of the outer panel 4, on which are formed radial elements 46 forming keys when molded or poured on the rear edge 11.

If a rigid outer panel 4 (made of metal, cured composite, etc.) is fastened to the air intake lip 1, it has radial elements 46 matching the radial openings 16 so as to snap into these. Gluing between the rear edge 11 and the front edge 41 can complete the fastening. Of course, the configuration presented in FIG. 11 can be reversed, in that the outer panel 4 would come to overlap outside a thinned region of the rear edge of the air intake lip 1, which would form a setback in the outer part 12 of the air intake lip.

Equally, the configuration can be reversed in that the rear edge of an air intake lip made of composite material is formed on the front edge of an outer panel 4, or is snapped onto the latter.

Figure 12:
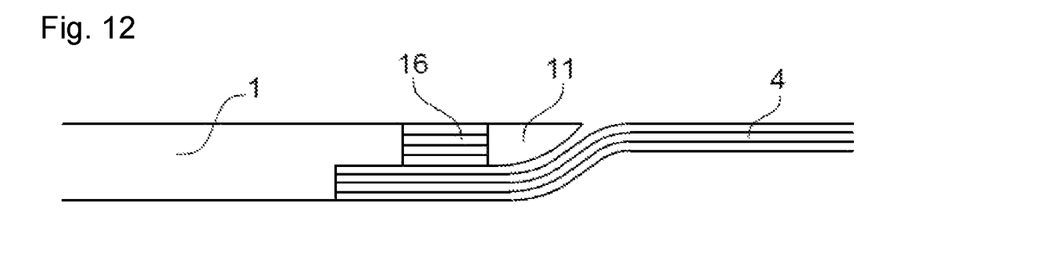
FIG. 12 shows, in a detail cross-sectional view, another example of a connection between an air intake lip and an outer panel of a front part of a nacelle for an aircraft propulsion unit, according to one embodiment of the invention, in which the outer panel is made of composite material.

FIG. 12 shows a variant of the embodiment of FIG. 11. Compared to the embodiment of FIG. 11, the embodiment of FIG. 12 comprises two features that can be applied independently of one another or in combination. According to this embodiment, the rear edge 11 of the air intake lip 1 is thinned. The thinning of the cross section of the rear edge permits a more rigid connection with an outer panel 4 and better surface continuity. The outer panel 4 is formed, for example poured, directly onto the rear edge 11, and overlaps on its inner face. According to another feature of the embodiment of FIG. 12, plies of composite material are installed in the radial openings 16, before these are covered, on the inner face of the rear edge 11, with plies of composite material constituting the outer panel 4.

Between installing plies of composite material in the radial openings 16 and forming the outer panel, the rear edge 11 may optionally have spread on it, on its inner face, a glue or an adhesive.

Figure 13:
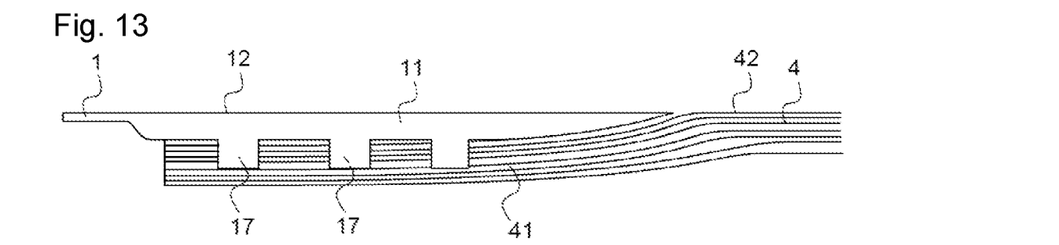
FIG. 13 shows, in a detail cross-sectional view, another example of a connection between an air intake lip and an outer panel of a front part of a nacelle for an aircraft propulsion unit, according to one embodiment of the invention, in which the outer panel is made of composite material.

FIG. 13 shows an exemplary embodiment in which the rear edge 11 of the air intake lip 1 comprises radially projecting parts 17, on its inner surface.

The radially projecting parts 17 thus extend essentially in the direction of the longitudinal axis L of the nacelle. The radially projecting parts are here shown in section. They may correspond to annular parts (extending over the entire inner surface of the air intake lip 1) of which there may be one, two, three or more, or to discrete elements distributed over the periphery of the air intake lip. The outer panel 4 is made of composite material, and its front edge is formed, for example poured, directly on the rear edge 11 of the air intake lip, specifically on the inner surface of the rear edge 11. The front edge 41 of the outer panel 4 adopts a shape matching that of the rear edge 11, in particular at the radial projections 17. The resulting nesting between the rear edge 11 and the front edge 41 makes it possible for the air intake lip 1 to be held radially and longitudinally relative to the outer panel 4. A surface treatment may optionally be carried out, or an adhesive deposited at the interface between the air intake lip 1 and the outer panel 4, prior to forming the assembly of these elements (for example prior to forming the outer panel 4 of composite material), in order to improve adhesion between these elements.

Of course, the configuration can be reversed without departing from the scope of the invention, with radially projecting elements formed on the outer panel 4 and an air intake lip 1 whose composite rear edge is formed on the front face 41 of the outer panel 4.

Rigid element assembly by snap-fitting can also be envisaged according to the configuration of FIG. 13.

The radially projecting parts 17 can be machined or added to the piece in question, or be formed therewith, in particular if the piece is made of composite material.

Figure 14:
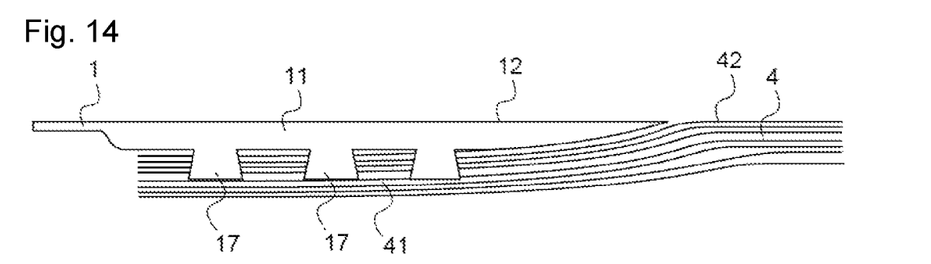
FIG. 14 shows, in a detail cross-sectional view, another example of a connection between an air intake lip and an outer panel of a front part of a nacelle for an aircraft propulsion unit, according to one embodiment of the invention, in which the outer panel is made of composite material.

FIG. 14 shows a variant of embodiment of FIG. 11. In this variant, the radially projecting parts 17 have inclined edges, specifically edges having an undercut with respect to the outer panel. These radially projecting parts are machined in the rear edge 11 of the air intake lip 1. The radially projecting parts 17 are thus held captive in the front edge 41 when the latter is formed directly on the rear edge 11. This results in a connection, between the air intake lip and the outer panel, that is rigid, reliable and permanent or at least difficult to undo. A surface treatment may optionally be carried out, or an adhesive deposited at the interface between the air intake lip 1 and the outer panel 4, prior to forming the assembly of these elements (for example prior to forming the outer panel 4 of composite material), in order to improve adhesion between these elements.

Figure 15:
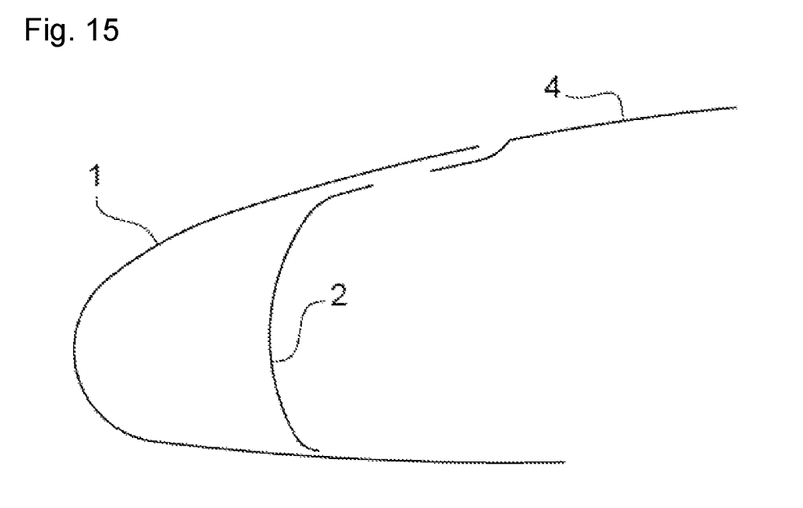
FIG. 15 shows, in a cross-sectional partial concept view, an anterior part of a nacelle formed according to a first aspect of the invention.
Figure 16:
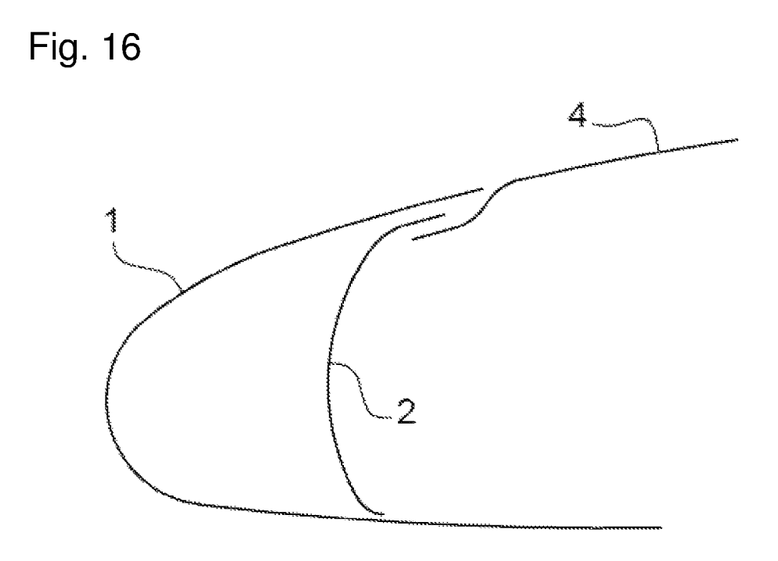
FIG. 16 shows, in a cross-sectional partial concept view, an anterior part of a nacelle formed according to a first aspect of the invention.

FIG. 15 shows a view analogous to the one in FIG. 3 of a nacelle anterior part created in accordance with an embodiment of the invention. In particular, the connection zone between the air intake lip 1 and the outer panel 4 may be created in accordance with the invention, for example according to one of the embodiments described with reference to one of FIGS. 4 to 14. FIG. 16 illustrates the fact that the connection between the front frame 2 and the air intake lip 1 can, according to the above-described principles, be integrated with the connection between the air intake lip 1 and the outer panel 4.

The invention developed in this manner makes it possible to obtain a connection between the air intake lip and the outer panel of an aircraft propulsion unit nacelle, without using rigid and fully penetrating connection means, such as a rivet, which would alter the outer surface of the aerodynamic profile formed by the nacelle. The nesting of the rear edge of the air intake lip and the edge, which is more or less complex, permits reliable relative positioning of the pieces with respect to one another and all or part of the hold between the pieces. Use may be made of a glue, a weld or a solder. In the case of an outer panel and/or an air intake lip made of composite material, one of these pieces may be formed, for example poured, directly in position with respect to the other part (which in the case of a metal part may be locally treated, in particularly chemically or by laser, to ensure good adhesion of the piece made of composite material). The same applies to pieces made of a hybrid metal/composite material.

Added penetrating connections can be eliminated or greatly reduced in number in the front part of the nacelle. In particular, all of the added penetrating fasteners can be eliminated in the orbital plane for fastening the air intake lip to the outer panel, with only a small number of penetrating fasteners remaining, as the case may be, at splices between various constituent sectors of the front part of the nacelle. In various embodiments, the invention permits an efficient transfer of forces between a metal air intake lip and an outer panel made of composite material having a thermosetting, thermoplastic or other matrix, limiting or avoiding the need for a transfer of forces by chemical adhesion (for example by gluing). Thus, the flow of air over the outer surface of the anterior part of the nacelle is not disrupted by local discontinuities or deformations, which allows a perfectly laminar flow of air.

Advantageously, it is provided for at least part of the metal surfaces, of the contacting surfaces between the lip 1 and the outer panel 4, to be treated. The surfaces are attacked chemically or mechanically (for example by bombardment using an electronic laser) so as to roughen them to improve adhesion.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An anterior part of a nacelle of an aircraft propulsion assembly, said anterior part having a front end allowing air to enter and a rear end configured to be connected to a remainder of the nacelle, said anterior part comprising:
   an air intake lip disposed at said front end,
   an outer panel, an outer face of which extends an outer part of the air intake lip, a front edge of the outer panel being connected to a rear edge of the air intake lip,
   wherein the front edge of the outer panel and the rear edge of the air intake lip are shaped so as to overlap radially and nest so as to ensure a continuous surface between an outer surface of the outer part of the air intake lip and the outer face of the outer panel, and
   wherein the front edge of the outer panel is connected to the rear edge of the air intake lip with no added rigid element fully penetrating said front edge of the outer panel and the rear edge of the air intake lip,
   wherein one of the outer panel and the air intake lip rear has an opening in which the other of the outer panel edge and the air intake lip resides.

2. The nacelle anterior part according to claim 1, in which the rear edge of the air intake lip has a thinned section that reduces in thickness progressively to an end of the thinned section.

3. The nacelle anterior part according to claim 1, in which the front edge of the outer panel is connected to the rear edge of the air intake lip using a glue.

4. The nacelle anterior part according to claim 1, in which the front edge of the outer panel is connected to the rear edge of the air intake lip by welding or soldering.

5. The nacelle anterior part according to claim 1, in which
   the outer panel is formed of a composite material and in which the front edge of said outer panel is formed directly on the rear edge of the air intake lip, or
   the air intake lip is formed of a composite material and in which the rear edge of said air intake lip is formed directly on the front edge of the outer panel.

6. The nacelle anterior part according to claim 1, in which either the rear edge of the air intake lip or the front edge of the outer panel comprises radially projecting parts that are captively held in the other of the front edge of the outer panel and the rear edge of the air intake lip.

7. The nacelle anterior part according to claim 1, in which the front edge of the outer panel radially surrounds the rear edge of the air intake lip.

8. The nacelle anterior part according to claim 1, in which the rear edge of the air intake lip radially surrounds the front edge of the outer panel.

9. The nacelle anterior part according to claim 1, comprising a surface coating formed straddling the outer face of the outer panel and the outer part of the air intake lip.

10. The nacelle anterior part according to claim 1, wherein the lip and outer panel being made of metal and a contacting surface between the lip and outer panel is roughened.

11. A nacelle of an aircraft propulsion unit, comprising an anterior part according to claim 1.

12. An anterior part of a nacelle of an aircraft propulsion assembly, said anterior part having a front end allowing air to enter and a rear end configured to be connected to a remainder of the nacelle, said anterior part comprising:
    an air intake lip disposed at said front end,
    an outer panel, an outer face of which extends an outer part of the air intake lip, a front edge of the outer panel being connected to a rear edge of the air intake lip,
    wherein the front edge of the outer panel and the rear edge of the air intake lip are shaped so as to overlap radially and nest so as to ensure a continuous surface between an outer surface of the outer part of the air intake lip and the outer face of the outer panel, and
    wherein the front edge of the outer panel is connected to the rear edge of the air intake lip with no added rigid element fully penetrating said front edge of the outer panel and the rear edge of the air intake lip,
    wherein either the rear edge of the air intake lip or the front edge of the outer panel comprises radial openings that are filled with the other of the front edge of the outer panel and the rear edge of the air intake lip.

13. The nacelle anterior part according to claim 12, in which that one of the front edge of the outer panel and the rear edge of the air intake lip that fills the radial openings is formed of a composite material, and comprises plies of composite materials that fill said radial openings and are distinct from the other plies constituting said outer panel or said air intake lip.

* * * * *